US008882955B2

(12) United States Patent
Brandon et al.

(10) Patent No.: US 8,882,955 B2
(45) Date of Patent: Nov. 11, 2014

(54) AUTOMATED LABELING METHOD AND LABEL SUPPLY THEREFOR

(75) Inventors: Dwayne K. Brandon, Damascus, OR (US); Robert L. Leighton, Edmonds, WA (US)

(73) Assignee: Superior Tape & Label Incorporated, Gresham, OR (US)

( * ) Notice: Subject to any disclaimer, the term of this patent is extended or adjusted under 35 U.S.C. 154(b) by 464 days.

(21) Appl. No.: 13/135,492

(22) Filed: Jul. 7, 2011

(65) Prior Publication Data

US 2013/0011629 A1 Jan. 10, 2013

(51) Int. Cl.

| | |
|---|---|
| ***B29C 65/48*** | (2006.01) |
| ***B32B 37/10*** | (2006.01) |
| ***B32B 38/04*** | (2006.01) |
| ***B32B 38/14*** | (2006.01) |
| ***B32B 38/18*** | (2006.01) |
| ***B65C 3/00*** | (2006.01) |
| ***B65C 9/18*** | (2006.01) |
| ***B65C 9/46*** | (2006.01) |
| ***G09F 3/02*** | (2006.01) |
| ***G09F 3/10*** | (2006.01) |

(52) U.S. Cl.

CPC ................. *B65C 3/00* (2013.01); *B65C 9/1826* (2013.01); *B65C 9/46* (2013.01); *G09F 3/02* (2013.01); *G09F 3/10* (2013.01)

USPC .......................................... 156/261; 156/277

(58) Field of Classification Search

USPC ................ 156/250, 261, 277; 428/40.1, 41.7, 428/41.8, 42.1, 195, 198, 354, 913

See application file for complete search history.

(56) References Cited

U.S. PATENT DOCUMENTS

| | | | | |
|---|---|---|---|---|
| 5,332,265 | A | 7/1994 | Groess et al. | |
| 5,351,426 | A | 10/1994 | Voy et al. | |
| 5,387,302 | A * | 2/1995 | Bernard et al. | 156/352 |
| 5,531,853 | A | 7/1996 | Cubow et al. | |
| 5,578,352 | A | 11/1996 | Smith | |
| 5,645,680 | A | 7/1997 | Rietheimer | |
| 5,691,437 | A | 11/1997 | Main | |
| 5,738,383 | A | 4/1998 | Main et al. | |
| 5,738,748 | A | 4/1998 | Mitchell, Jr. | |
| 5,750,192 | A | 5/1998 | Smith | |
| 5,782,496 | A | 7/1998 | Casper et al. | |
| 5,866,181 | A | 2/1999 | Hill | |
| 5,985,441 | A | 11/1999 | Szczepaniec et al. | |
| 6,037,042 | A | 3/2000 | Kato et al. | |
| 6,179,030 | B1 | 1/2001 | Rietheimer | |
| 6,210,054 | B1 | 4/2001 | Adams et al. | |
| 6,230,780 | B1 | 5/2001 | Rietheimer | |
| 6,352,751 | B1 | 3/2002 | Miles et al. | |
| 6,383,591 | B1 | 5/2002 | Miles et al. | |
| 6,383,631 | B1 | 5/2002 | Mehta | |
| 6,585,437 | B1 | 7/2003 | Wiklof et al. | |
| 6,773,539 | B2 | 8/2004 | Mertens et al. | |
| 6,830,795 | B1 | 12/2004 | Downs | |
| 6,890,112 | B2 | 5/2005 | Kline | |
| 7,329,449 | B2 | 2/2008 | Wiklof et al. | |
| 7,588,811 | B2 | 9/2009 | Blank et al. | |
| 7,820,264 | B2 | 10/2010 | Blank et al. | |
| 7,964,228 | B2 | 6/2011 | Milliorn | |
| 8,537,184 | B2 * | 9/2013 | Roth et al. | 347/171 |
| 2003/0192639 | A1 * | 10/2003 | Mitchell et al. | 156/250 |

(Continued)

*Primary Examiner* — Sing P Chan

(74) *Attorney, Agent, or Firm* — Portland Intellectual Property, LLC

(57) ABSTRACT

An automated labeling method and label supply therefor. The method and label supply are particularly adapted for labeling produce, and more particularly fruit, in high volumes at high speed.

4 Claims, 11 Drawing Sheets

(56) References Cited

U.S. PATENT DOCUMENTS

| | | | | |
|---|---|---|---|---|
| 2005/0255298 | A1 | 11/2005 | Cram | |
| 2006/0263594 | A1 | 11/2006 | Kraft et al. | |
| 2007/0252381 | A1* | 11/2007 | Weisz et al. | 283/105 |
| 2008/0307686 | A1 | 12/2008 | Wade et al. | |
| 2009/0258116 | A1 | 10/2009 | Peyton et al. | |
| 2011/0205326 | A1 | 8/2011 | Roth et al. | |

* cited by examiner

AUTOMATED LABELING METHOD AND LABEL SUPPLY THEREFOR

FIELD OF THE INVENTION

The present invention relates, to an automated labeling method and label supply therefor, which are adapted for labeling produce, and more particularly fruit, in high volumes at high speed.

BACKGROUND

Often, fruit is packed at the packing facility in quantity into packages, and the packages are labeled to indicate the type of fruit and its origin. However, increasingly, grocery stores are demanding that individual articles of fruit be labeled, to avoid check-out errors that might occur when articles of fruit that may look similar need to be distinguished, such as where the store carries two different varieties of apples, with one being higher priced. So it is becoming more common to label individual articles of fruit and other produce. Such labels typically carry the following information: (1) trade or certification mark; (2) produce variety identification; and (3) PLU ("price look-up") or bar-code. Where a bar-code (or other scan-able code) is used, additional information is generally included, such as for tracing the article back to an original source.

There are hand-operated labeling devices that can be used at the point of sale by store personnel for this purpose, but it is usually more economical to provide such labels at the packing facility, at the time the produce is being sorted, inspected, gathered, and prepared for shipping.

Packing facilities typically have more than one "packing line," and a single packing line can be required to apply labels to 150-300 million articles of produce annually. Thus, it is highly desirable to automate the process as much as possible.

Using fruit packing as an example, the packing line begins at the point where a bin containing articles of produce picked or otherwise harvested from the field is dumped for initial preparation. Where the articles are articles of fruit, they are washed, sorted, and waxed, all of these operations being performed semi-automatically. After initial preparation, the articles are ready to be placed onto a fully automated portion of the packing line referred to as a "sizer." FIG. 1 shows the sizer 3 of the packing line 2, as well as a number of "tray filler sections" 4 that are fed in parallel by the sizer.

The sizer 3 has a number of parallel conveying "lanes" 5 for conveying the articles from a set of cameras 6 to the tray filler sections 4. Each conveying lane carries a series of cups 7, each cup being used to carry one article. The conveying lanes are computer controlled for speed, and the computer also tracks the location of each of the cups 7 as they are carried down the lanes.

After an article is introduced into a cup, the cup is caused to spin and in this spinning condition, the articles travel past the set of cameras 6. The cameras 6 image each article as it spins, and with this imaging information, the computer determines and associates with each article a definite average color.

After the articles are imaged, the spinning ceases and the cups proceed over a "weigh station" 8 for weighing the articles. The computer determines and associates with each article its measured weight, and the computer continues to track the location of the article as the cup carrying the article continues to travel down its respective lane.

The articles are next dropped out of their cups 7, as a result of the cups being tilted under computer control, onto conveyor belts 10 that function as the front ends of the tray filler sections 4. That is, there is a conveyor belt 10 for each tray filler section 4. At the tray filler sections, the articles are automatically loaded onto trays 11 that, typically, will function as packaging for the articles.

There are typically many more tray filler sections 4 than there are lanes 5, so the speed at which the articles are moving at the conveyor belts 10 may be reduced ten-fold, from about 150-200 feet per minute for each of the lanes to about 15-20 feet per minute at tray filler section.

With reference to FIG. 2, this speed reduction makes it practical for one or more human operators at a tray filler section to perform a visual inspection of the articles, referenced as 12, decide whether each article is acceptable or should be discarded, and arrange the articles in compartments 13 of the trays 11.

There are automated labeling systems known in the art for labeling the articles downstream of the weigh station 8 but upstream of the tray filling sections 4. Specifically, a labeling head 14 is provided for each of the lanes 5. Each labeling head has a dedicated reel 15 of labels, i.e., the labels are (spirally) flat-wound on a reel so as to form successive layers, one layer overlaying the next. Each layer is formed of two layers that together define a contiguous length of label material or "web:" (1) a layer of label material having printing on a top side and a bottom side that is coated with an adhesive, and (2) a removable "liner" material that does not adhere strongly to the adhesive and can be peeled therefrom.

Individual labels on the web are pre-defined on the liner by being pre-cut. Each label is applied to a corresponding article to be labeled after the label layer is peeled from the liner layer by running the web across a "peel plate."

All of this activity must occur while articles are traveling at 150-200 feet per minute, which is a technical challenge. It is often the case that the labels are not completely applied and become dislodged during transit, and if there is any malfunction in a labeling head, an entire lane will be disabled.

The liner, after being peeled from the label, is taken up on another reel and must be discarded, imposing an additional cost. The mechanism is also typically exposed to and retains substantial amounts of adhesive and must be frequently cleaned to maintain satisfactory operation.

The present invention provides a more practical and cost effective automated labeling method and apparatus, particularly for labeling produce, and more particularly for labeling fruit.

SUMMARY

An automated labeling method and label supply therefor are disclosed herein.

The label supply includes an elongate web of label material. The web has right and left side outer edges defining therebetween an application face of the web and an opposed, label face of the web. The application face is for making contact with an article to be labeled, and the label face is for bearing information provided in at least one of (a) a human readable form and (b) a machine readable form. The label face has at least one adhesive resisting area within which an adhesive resisting composition has been applied thereto. The edges each define a corresponding line, parallel to the elongate axis of the label web, such that the lines define therebetween the maximum width of the web.

According to a first aspect of the invention, the application face has a plurality of spaced apart, discrete adhesive areas within which an active adhesive is contained and supported by the application face, and the adhesive areas are spaced apart from at least one of the lines by at least 1/16", and are spaced apart from each other by at least 3/32".

According to a second aspect of the invention, the label face has at least one adhesive resisting area within which an adhesive resisting composition is supported thereon, and the adhesive resisting area is spaced apart from at least one of the lines by at least 1/16".

Label supplies may have features according to either or both the first and second aspects of the invention.

According to a third aspect of the invention, a method for labeling an article is disclosed that includes the following steps: (1) providing an elongate web of label material having an application face supporting an adhesive and an opposite, label face supporting an adhesive resisting composition within a predetermined area thereof; (2) printing, within an area that defines a label portion of the label face, information in at least one of (a) a human readable form and (b) a machine readable form, outside of said adhesive resisting area; and (3) thereafter excising the label portion from the web and applying the label portion to the article.

Preferably the label portion accords with one or both of the first and second aspects.

Preferably, the step of applying is performed substantially contemporaneously with the step of printing.

Preferably, the step of excising includes bringing together the label portion and a pick-up mechanism, temporarily adhering the label portion to the pick-up mechanism, and moving the pick-up mechanism with the label portion temporarily adhered thereto so as to draw the web against a cutting edge, thereby tearing the label portion from the web. More preferably, the cutting edge is aligned relative to the label web such that it makes a non-zero angle with respect to the plane of the web, so that the tearing is cross-wise progressively achieved.

The aforedescribed preferences for the steps of applying and excising may be provided in any combination.

Methods according to the third aspect of the invention may be employed separately or in combination with any one or more of the above described automated labeling methods and label supplies.

According to a fourth aspect of the invention, a method for feeding a label web through an automated labeling apparatus is disclosed. The method includes applying a frictional force to the label web at a first location thereon so as to push the label web in a downstream feed direction, and applying, independently of the first frictional force and at a second location downstream of the first location, a second frictional force to the label web to further push the label web in the feed direction. The second frictional force is applied so as to follow a movement of the label web produced at the second location by the first frictional force, such as by a motor operating in torque mode.

Preferably, where the application face has exposed active adhesive thereon, the second frictional force is applied at least primarily to one or more areas thereof that are clear of the adhesive. More preferably, where the web has right and left side outer edges defining, therebetween, the application and label faces, the one or more areas extend to one or both of the edges.

Methods according to the fourth aspect of the invention may be employed separately or in combination with any one or more of the above described automated labeling methods and label supplies.

According to a fifth aspect of the invention, a method for feeding an elongate web of label material through an automated labeling apparatus is disclosed, where the web has, on a label application face thereof, exposed active adhesive. The method includes applying a frictional force to the label web primarily at one or more areas of the label application face that are clear of the adhesive. Methods according to the fifth aspect of the invention may be employed separately or in combination with any one or more of the above described automated labeling methods and label supplies.

According to a sixth aspect of the invention, a method for feeding a contiguous elongate web of label material through an automated labeling apparatus is disclosed. The method includes advancing the web along a track into a predetermined position wherein a label portion of the web is aligned with an aperture through the track, supporting the label portion over the aperture with a moveable support member during at least a portion of said step of advancing, and withdrawing the support member thereafter.

Preferably, the method further includes, during or after the step of withdrawing, bringing together a label pick-up mechanism and the label portion so as to temporarily adhere the label portion to the pick-up mechanism, so that the pick-up mechanism supports the label portion instead of the support member.

Methods according to the sixth aspect of the invention may be employed separately or in combination with any one or more of the above described automated labeling methods and label supplies.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DETAILED DESCRIPTION OF PREFERRED EMBODIMENTS

Figure 1:
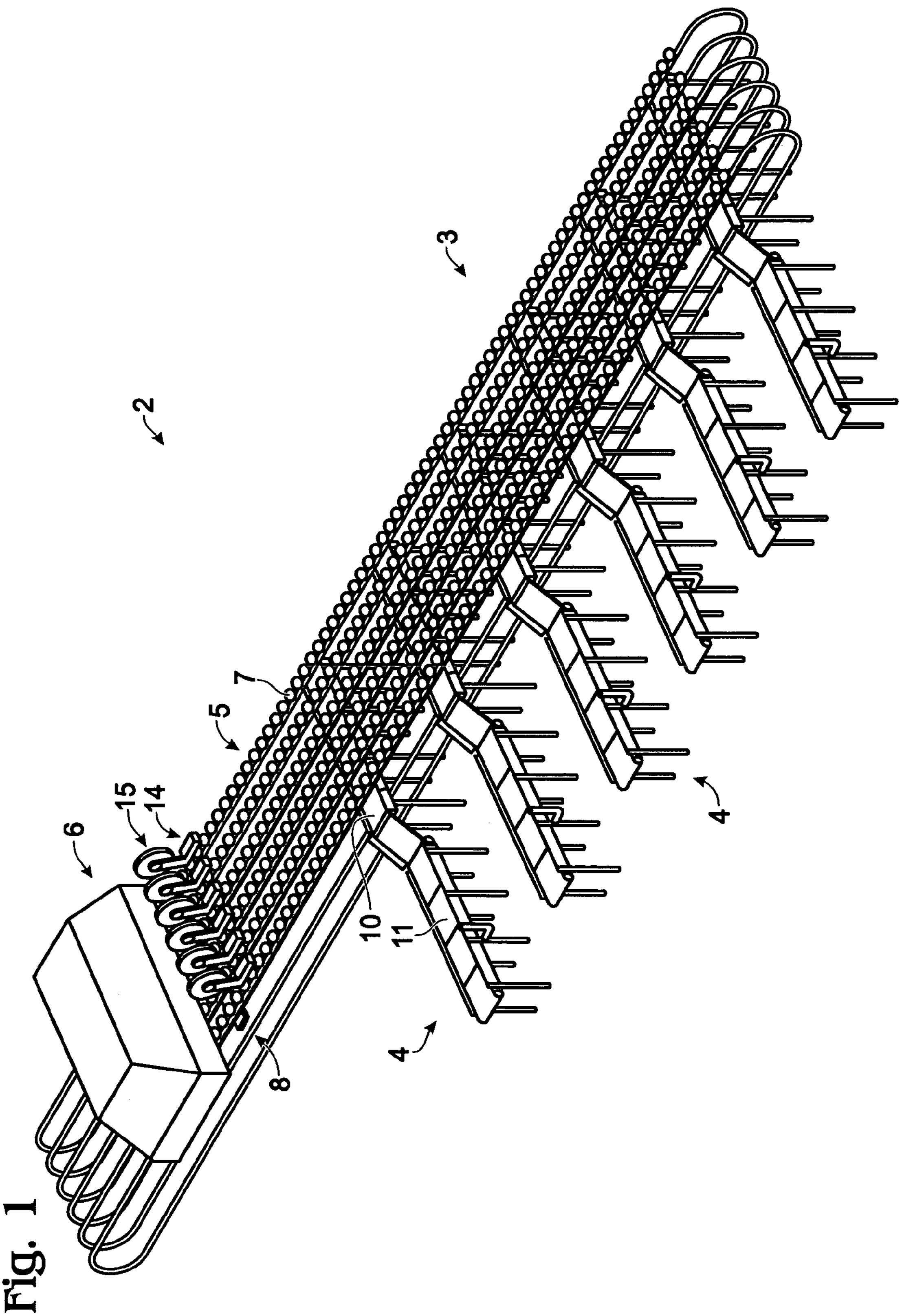
FIG. 1 is an isometric view of back end portions of a typical produce packing line.
Figure 2:
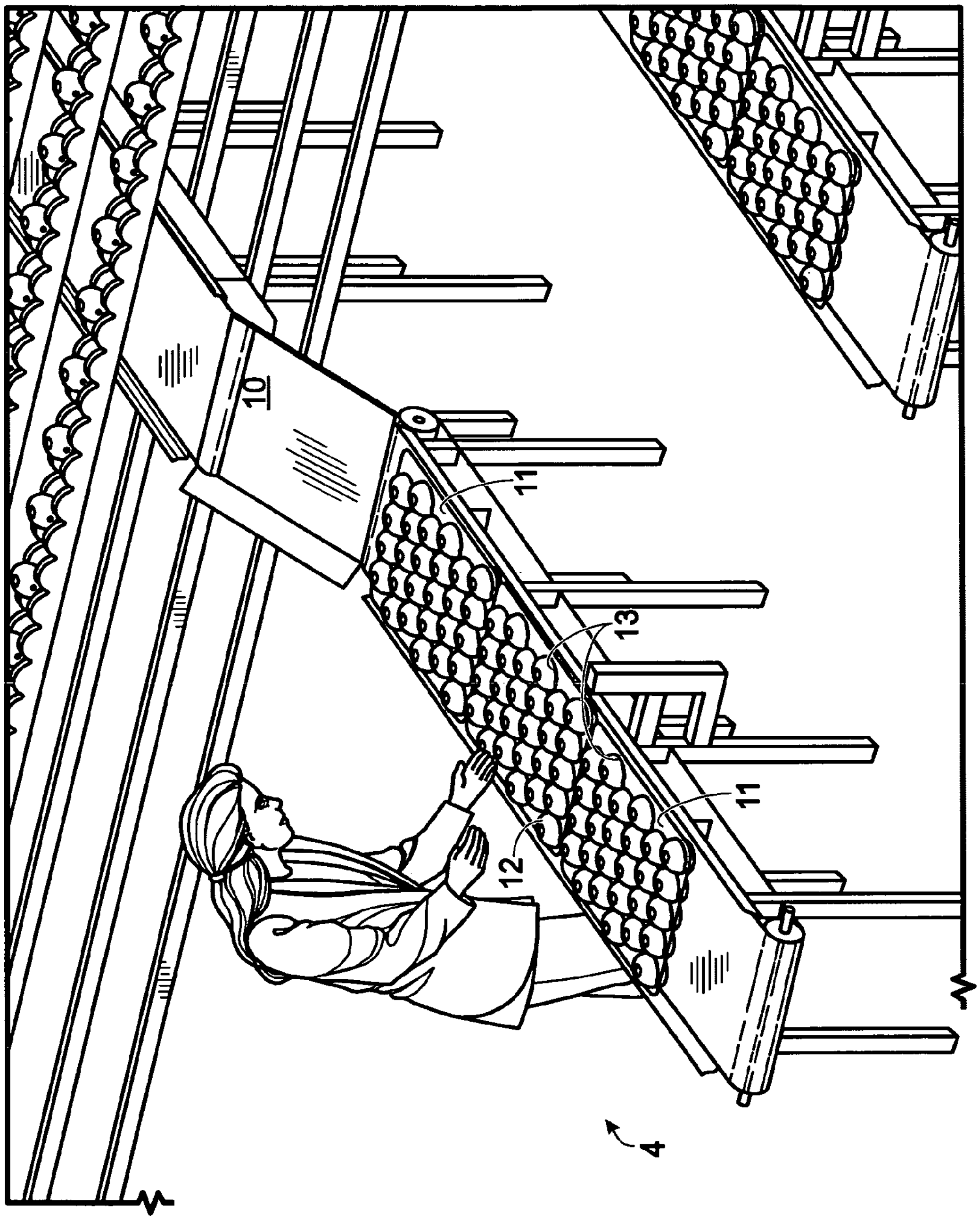
FIG. 2 is an isometric view of a drop for the produce packing line of FIG. 1.
Figure 3:
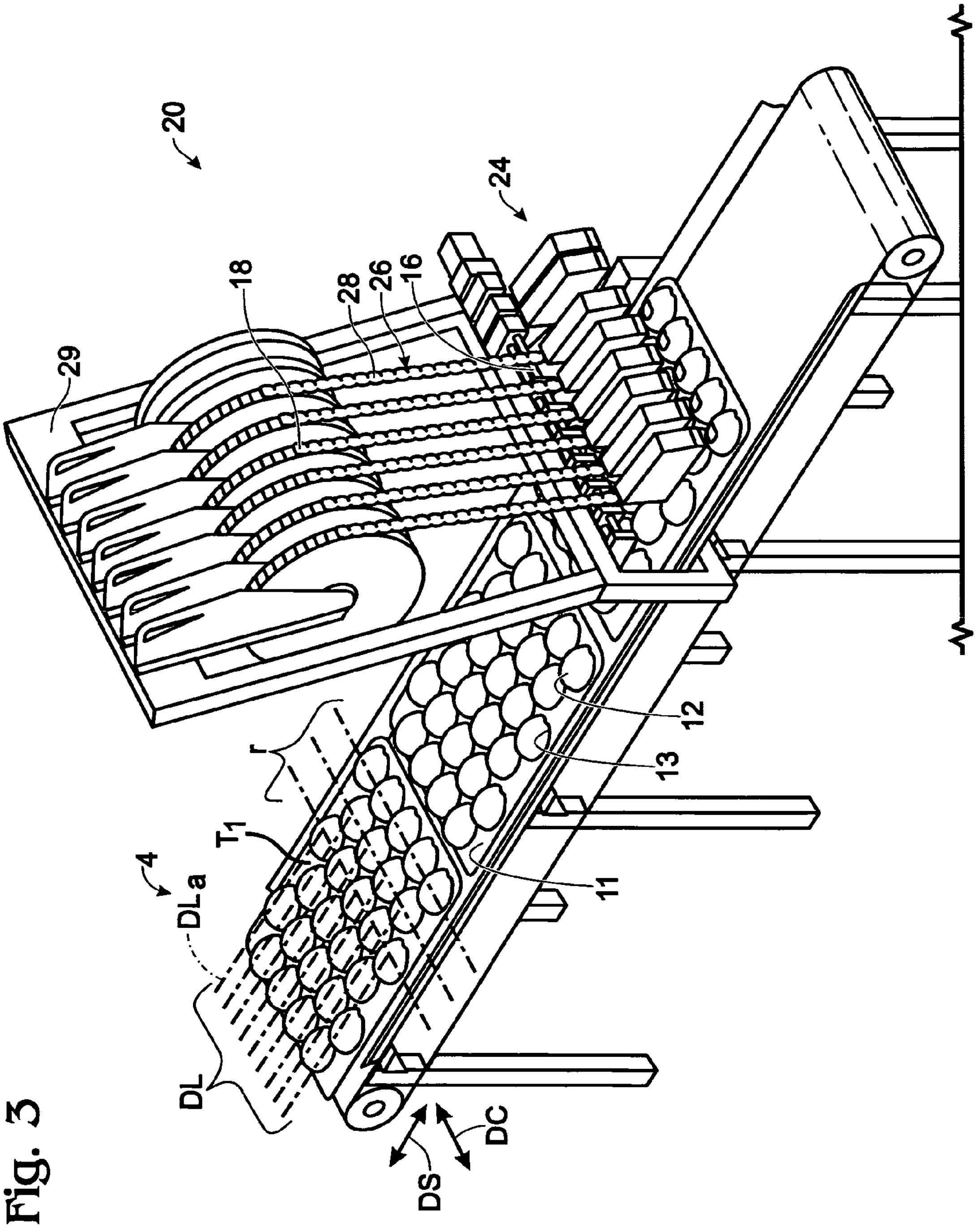
FIG. 3 is an isometric view of the drop of FIG. 2 equipped with an automated labeling apparatus according to the present invention.

Referring to FIG. 3, the present inventors have recognized the desirability of providing an automated labeling apparatus 20 at the tray filling sections 4, where articles 12 are moving at a relatively low speed, rather than at the aforedescribed sizer 3. For presentation to the apparatus 20, the articles 12 are installed in the compartments 13 of the aforementioned trays 11.

For each tray, the compartments define a plurality of tray filling section lanes "DL" running in a downstream direction "DS." The compartments also define a plurality of rows "r," defined in a cross-wise direction "DC." The direction DC is typically but need not necessarily be perpendicular to the downstream direction DS. The rows are, in an alternating fashion, offset from one another in the direction DC such as shown. This increases the spacing between the articles, and therefore decreases the linear density of the articles, in each lane by half. For example, the tray filling section lane $DL_a$ defined by the tray "$T_1$," has only three articles even though the tray has six rows. However, though it is preferred, this density reduction is not an essential feature.

The apparatus 20 includes one or more labeling heads 24. Each labeling head applies labels to the articles in one or more of the drop lanes provided from a corresponding reel 18 of labels.

The aforedescribed off-setting, in the cross-wise direction DC, of the articles in one of any two rows relative to the articles in the other of the two rows provides the advantage of allowing a single labeling head to service two drop lanes. This functionality may be provided by sliding the label heads 24 in the cross-wise direction DC along a rack 16, or preferably fixedly mounting the label heads to a slidable rack so that all the label heads 24 will move together, back and forth between two adjacent drop lanes. It will be appreciated that the same principle could be utilized to permit a single head to service any number "n" of the drop lanes, by off-setting the articles in one of any set of "n" rows relative to the articles in each of the other of the "n" rows. It will also be appreciated that off-setting the articles within a set of rows and providing for one label head 24 to service more than one row is not essential.

Each labeling head 24 is fed with a corresponding, dedicated supply 26 of elongate label material, or "web," in reel form, i.e., label material is spirally wound on a spool so as to form successive layers, one layer overlaying the next, as is typical practice. The reels are easily removable from a frame 29 for ease of replacement, and need not be provided as being slidable to move with the label heads 24.

According to the invention, each layer of the reel is a contiguous layer of material 28 that is not backed with a liner, i.e., the web is "liner-less."

Figure 5:
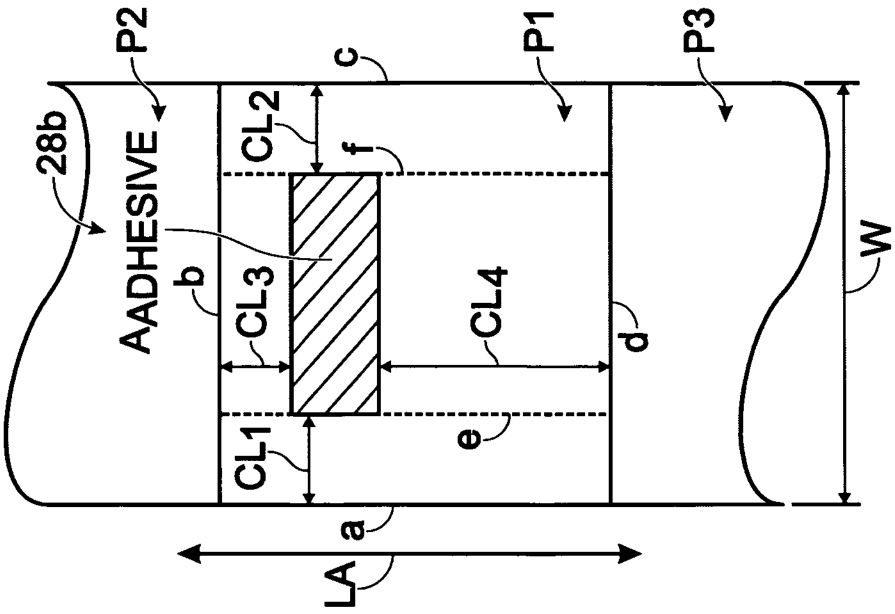
FIG. 5 is a schematic view of the bottom side of the label web of FIG. 4.
Figure 4:
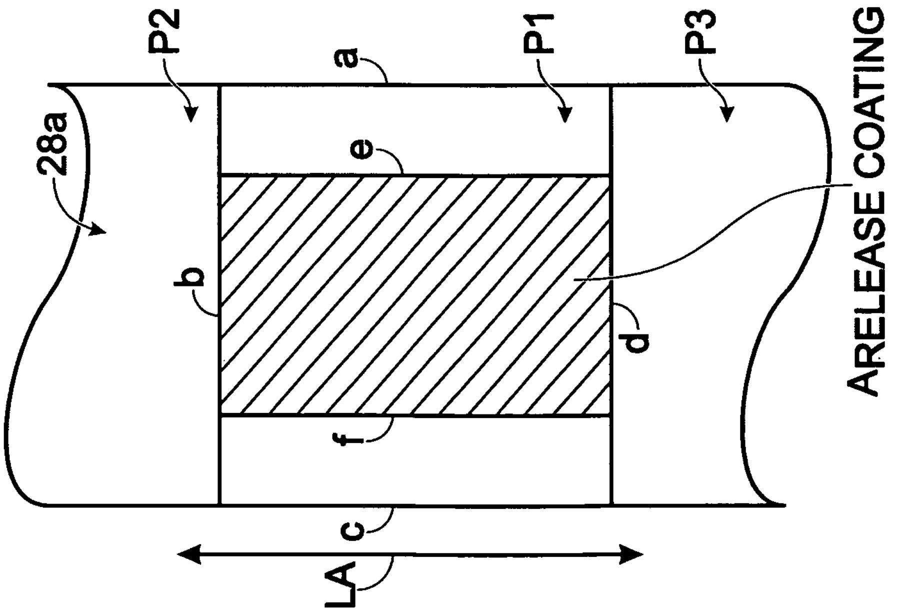
FIG. 4 is a schematic view of a top side of a label web according to the present invention, for use in the apparatus of FIG. 3.

FIGS. 4 and 5 show top and bottom sides **28*a* and 28*b*, respectively, of a length of the label web 28. As shown in both Figures, the label web 28** defines a plurality of label portions "P," three being shown in the Figures as $P_{1-3}$. Each of the label portions P will define a single label for application to an article, which is preferably an article of produce, and more preferably in particular, an article of fruit. For this purpose, the label portion P is relatively small, typically less than 1.0 square inches. For example, a preferred label portion P is about 0.67" (width)×0.83" (length, measured along the longitudinal axis "LA" identified below). However, it is to be understood that automated labeling methods and label supplies therefor according to the present invention need not be limited to any particular size of label, or article to be labeled.

The shape of the label portions P is defined by the labeling head in an operation that will be described below. For simplicity of explanation, the shape of the label portions P will be assumed to be rectangular, though this is not the preferred label shape.

A particular label portion $P_1$ is shown whole, adjacent two bordering label portions $P_2$ and $P_3$. All of the label portions P are preferably alike, so the discussion will focus on the label portion $P_1$ for convenience. The label portion $P_1$ is enclosed by the line segments "a," "b," "c," and "d."

The label web 28 unwinds from its reel, and travels through the labeling head, in a direction parallel to a longitudinal axis "LA" of the label web, the axis LA preferably though not necessarily being aligned with the tray filling section lanes DL as shown in FIG. 3.

Referring to FIG. 5, the bottom side of the label portion $P_1$ has an area "$A_{ADHESIVE}$" (shown cross-hatched) that has a smaller area than that of the label portion $P_1$. The area $A_{ADHESIVE}$ defines where, within the label portion $P_1$ of the label web 28, on the bottom side thereof, active adhesive is or may be provided according to the invention. For purposes herein, adhesive is "active" when it is functional as adhesive. In remaining areas, outside the area $A_{ADHESIVE}$, there is either no adhesive, or if there is adhesive, it has been "deadened," neutralized, or otherwise rendered inactive or nonfunctional such as by overlaying it with another coating. Hereinafter, it is to be understood that the term "adhesive" refers to active adhesive.

The adhesive is for adhering the label portion $P_1$, when it is excised from the length of label web 28 as will be discussed below, to the article being labeled. The adhesive may be any composition suitable for this purpose, and may therefore be any adhesive used in the prior art for the same purpose.

The shape of the area $A_{ADHESIVE}$ as shown is generally rectangular, which would generally be preferred if the label portion $P_1$ is also rectangular; however, however, it will be understood that the shapes of both the label portion $P_1$ and the area $A_{ADHESIVE}$ are somewhat arbitrary, so any other desired shapes could be provided and the shapes need not be the same.

Regardless of the shape of the area $A_{ADHESIVE}$, it is either spaced away from the line segment "a" by at least a clearance "$CL_1$," or it is spaced away from the line segment "c" by at least a clearance "$CL_2$," or both as shown. The clearances $CL_1$ and $CL_2$ are preferably equal and at least 1/16". Preferably, the spacing between the adhesive areas of adjacent label portions P, represented by the sum of the clearances "$CL_3$" and "$CL_4$," is at least 3/32".

The clearances $CL_1$ and $CL_2$ define corresponding line segments "e" and "f," respectively, that run parallel to the longitudinal axis LA. The line segments "e" and "f" are not actual physical constructs but are for conceptualization purposes only. The same segments are shown in FIG. 4, showing the top side of the label web 28.

The area enclosed by the line segments "b," "d," "e," and "f" defines an area "$A_{RELEASE\ COATING}$," which defines the area within which a "release coating" should be applied according to the invention. Release coatings are known and used to prevent one layer of a liner-less label web from adhering too strongly to the next layer when the layers are wound, one on top of the other. The release coating may therefore be any release coating used in the prior art, or any composition suitable for the same purpose.

The area $A_{RELEASE\ COATING}$ is preferably entirely covered with release coating so as to form, in combination with the similar areas of the other label portions P of the label web 28, a longitudinal strip running the entire length of the label web. This is to ensure that there will always be an area of release coating that fully overlaps the areas of adhesive, regardless of the longitudinal misalignment between these areas that will inevitably occur somewhere within the reel from one layer to the next. However, it would be possible to decrease the coverage, within the area $A_{RELEASE\ COATING}$, of release coating.

Longitudinally extending areas outside of the area $A_{RELEASE\ COATING}$ are defined between the line segments "b," "c," "d," and "f," on one side of this area, and between the line segments "a," "b," "d," and "e," on the other side of this area. Identically defined areas are present on the bottom side of the label web (FIG. 5). These areas will be referred to as "available areas," with the available areas on the top side of the label web 28 being referred to specifically as "available top-side areas," and the available areas on the bottom side of the label web being referred to as "available bottom-side areas."

The available top side-areas are devoid of release coating, and the available bottom-side areas are devoid of adhesive. The available top and bottom-side areas each extend fully longitudinally across the length of the label web 28, and these areas, or portions thereof, are preferably used as "grip" areas for use by the labeling head to be described below, to grip the material 28, for translating it through the label head, without the necessity of coming into contact with any coating. It is particularly advantageous that the labeling head avoid coming into contact with adhesive, so the use of all or portions of the available areas as grip areas provides the outstanding advantage of reduction or elimination of the transfer of adhesive to the apparatus.

The top side of the label web 28 is to bear printing, which is typically applied by a thermal printer built-into the label head 24, the label being coated with a thermally responsive material, but which may be applied by an ink-jet type printer or other type of printer, and which may be provided at some other location along the tray filling section 4. The printer prints information on the label that is desired for identifying the article within the stream of commerce. As in the prior art, the information typically includes (1) trade or certification mark; (2) produce variety identification; and (3) a PLU or scan-able code, typically a bar-code. There may be size information, and price information coded on the label, and there may be many different varieties of the article running on the same packing line. So it is generally considered impractical to provide the label web 28 pre-printed with all the necessary information, i.e., it is generally necessary as a practical matter to be able to print onto the label contemporaneously with the labeling process. Printing of this on-demand, contemporaneous nature is referred to herein as "variable" printing, which is to be distinguished from "static" printing, i.e., information that would be common to all the labels on a reel and therefore could be provided on the labels prior to the labeling process.

One known drawback of liner-less labels is that, because they require a release coating on the top side of the label where the printing is to be, variable printing must imprint "through" the release coating. Means for printing through release coatings are known and used in the art, but they impose material and cost limitations that are undesirable.

The present invention effectively solves this problem by providing release coating only in the area $A_{RELEASE\ COATING}$, leaving all of the remaining area free for variable printing.

Figure 6:
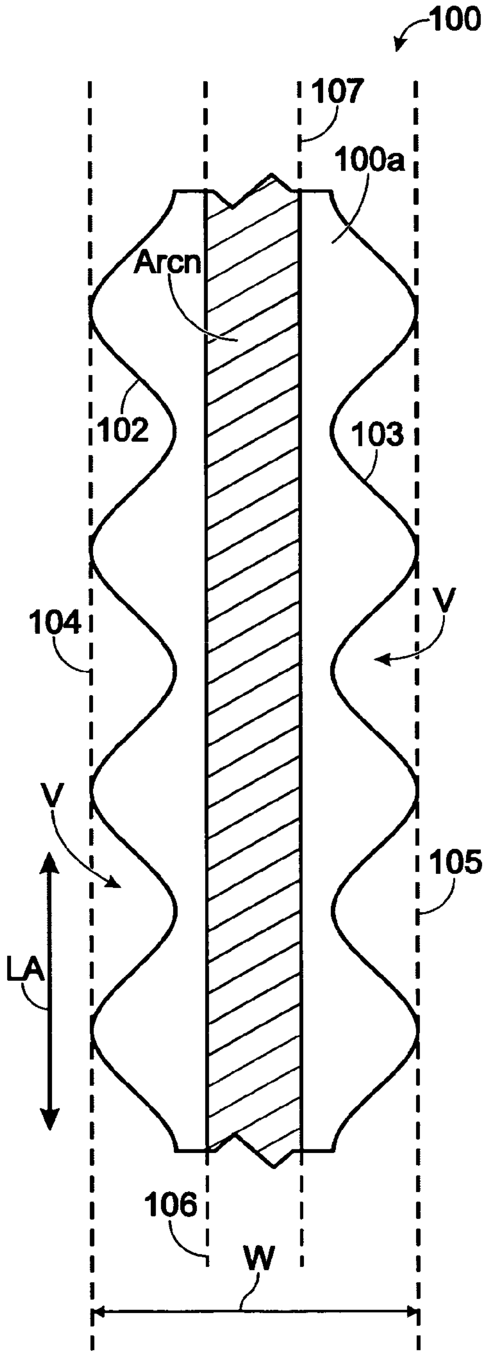
FIG. 6 is a schematic view of the top side of a more general label web than that shown in FIGS. 4 and 5 according to the present invention, for use in the apparatus of FIG. 3.
Figure 7:
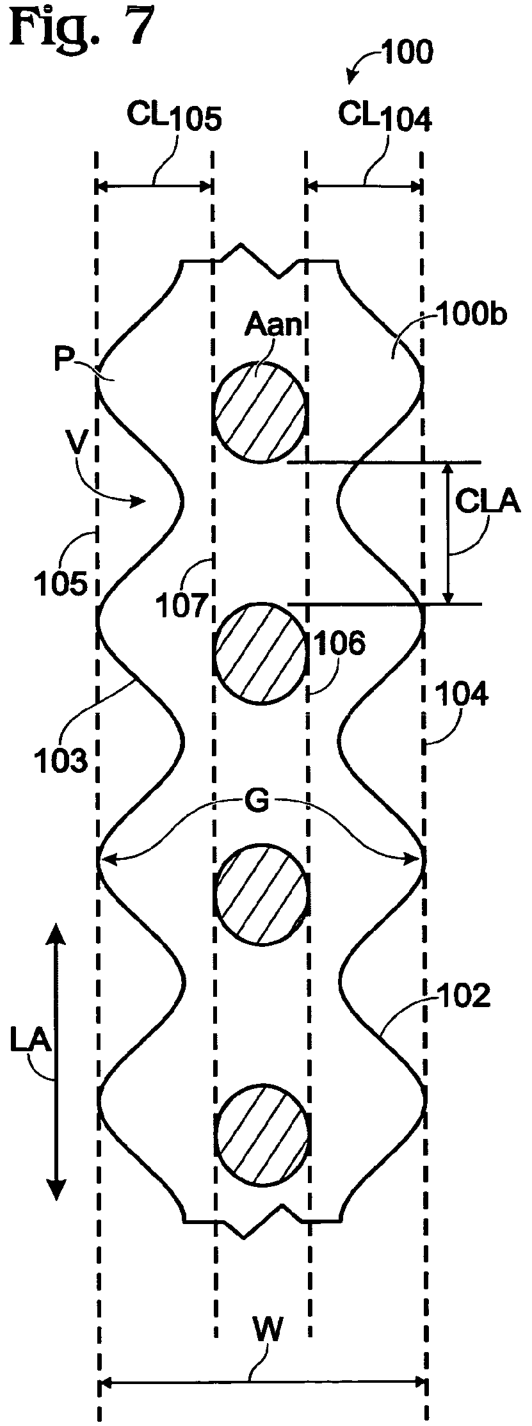
FIG. 7 is a schematic view of the bottom side of the label web of FIG. 7.

Referring to FIGS. 6 and 7, a more generalized configuration of a label web according to the invention is shown, referenced as 100. FIG. 6 shows the top side 100*a* and FIG. 7 shows the bottom side 100*b*. The material 100 has two edges 102, 103. The edges define corresponding parallel lines 104, 105, that are parallel to the longitudinal axis LA. The lines 104, 105 define, therebetween, the maximum width W of the material 100.

Referring to particularly to FIG. 7, a number of discrete adhesive areas, referenced generally as "$A_{an}$," are provided for retaining the adhesive (the areas $A_{an}$ are shown cross-hatched). The adhesive areas are, preferably, periodically spaced along the axis LA. The adhesive areas, at their points of closest approach to the lines 104, 105, define parallel lines 106, 107 that are parallel to the longitudinal axis LA.

The distance between the lines 104 and 106 defines a clearance $CL_{104}$, and the distance between the lines 105 and 107 defines a clearance $CL_{105}$. Preferably, the clearances $CL_{104}$ and $CL_{105}$ are equal and are at least 1/16" to provide areas of significant size adjacent the edges of the material 100 that are free of adhesive that can be used as grip areas. However, the clearances need not be equal, and it is not necessary that both clearance amounts be non-zero.

Each adhesive area is also spaced apart from its neighboring adhesive areas, such as by the clearance amount referenced as $CL_A$. Preferably, the amount of the clearance $CL_A$ is at least 3/32".

Voids "V" defined between the edge 102 and the lines 104, 106, and between the edge 103 and the lines 105, 107, for each of the label portions P are desirably employed according to the invention as replacements for the typical, printed "eye-mark" that is typically used in conjunction with a photo-detector to signal to a controller (such as the controller 84 described below) the position of the label portions P. The photo-detector can detect the passage of a void "V," obviating the need for applying an eye-mark.

Turning to FIG. 6, the release coating area $A_{rcn}$ is provided for the release coating. Its edges are preferably aligned with the lines 106, 107 defined by the adhesive areas $A_{an}$, to ensure that the adhesive areas will be covered by release coating when the label web 100 is spirally wound. That is, preferably the same clearances $CL_{104}$ and $CL_{105}$ defined above for the adhesive areas are provided for the release coating area $A_{rcn}$. However, it will be appreciated that exact alignment between the adhesive and release coating is not possible or necessary, and for purposes herein, the clearances are to be considered "substantially" the same if the deviation is less than or equal to 1/32".

In FIG. 6, all of the area between the edge 102 of the material 100 and the corresponding edge of the release coating area indicated at 106, and all of the area between the edge 103 of the material 100 and the corresponding edge of the release coating indicated at 107, can be imprinted without the need to print "through" release coating.

Figure 8:
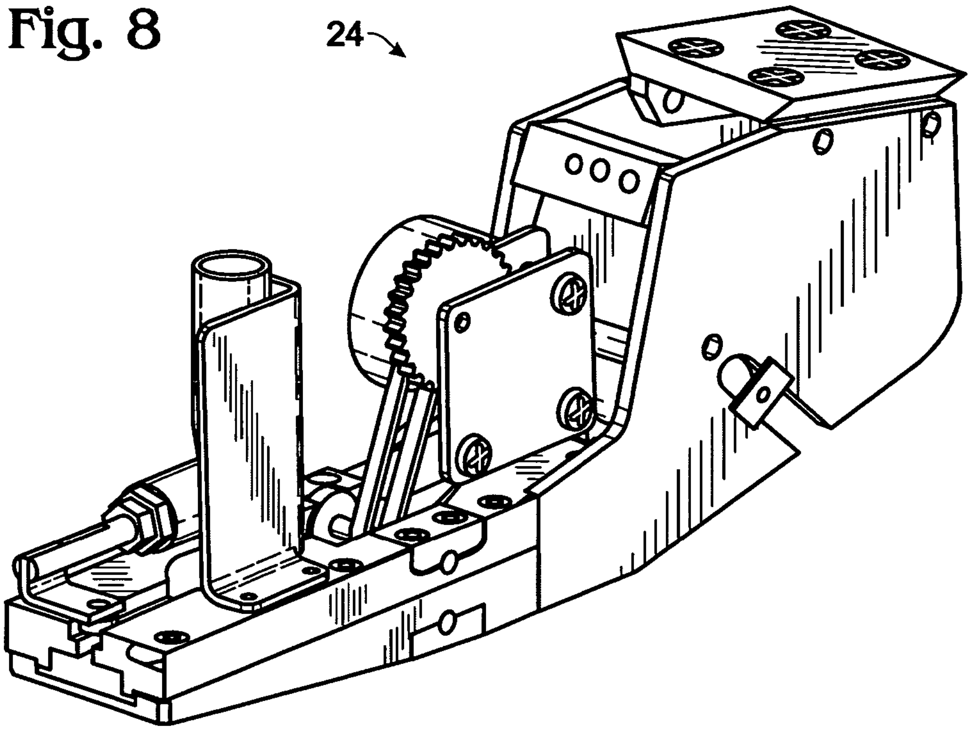
FIG. 8 is an isometric view of a labeling head according to the present invention.
Figure 9:
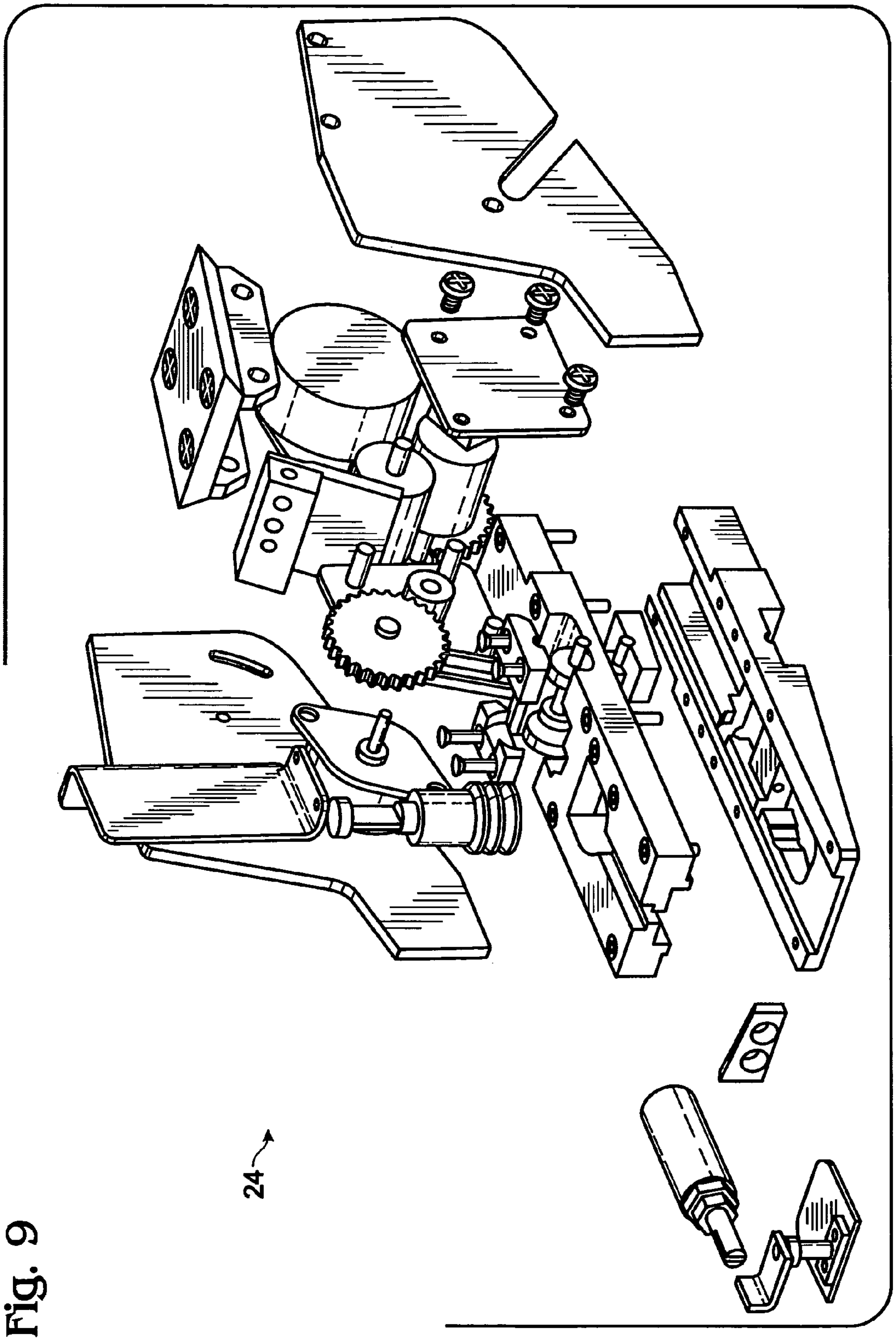
FIG. 9 is an isometric exploded view of the labeling head of FIG. 8.
Figure 10:
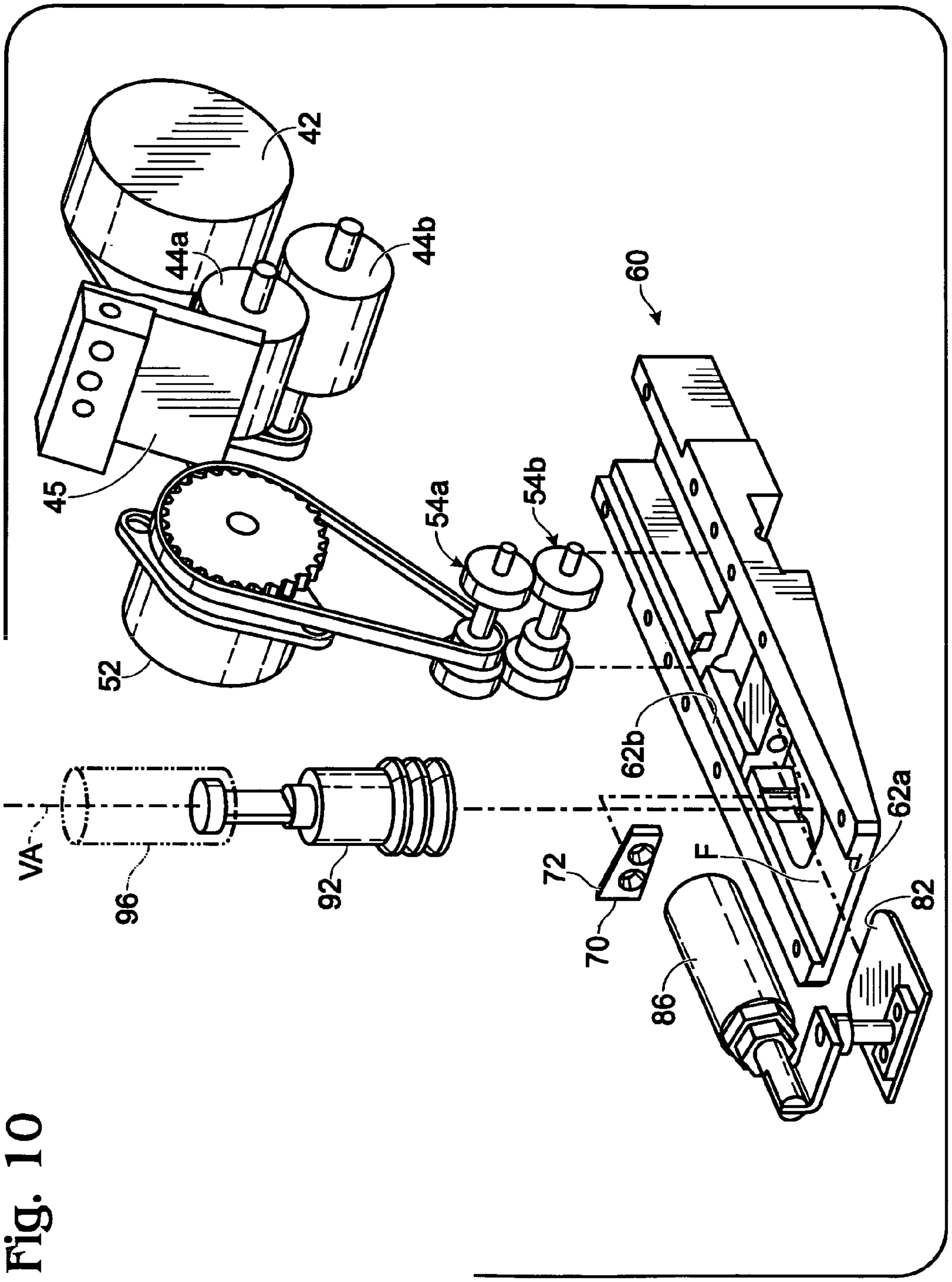
FIG. 10 is an isometric exploded view of the labeling head of FIG. 8 with extraneous parts removed for clarity.
Figure 11:
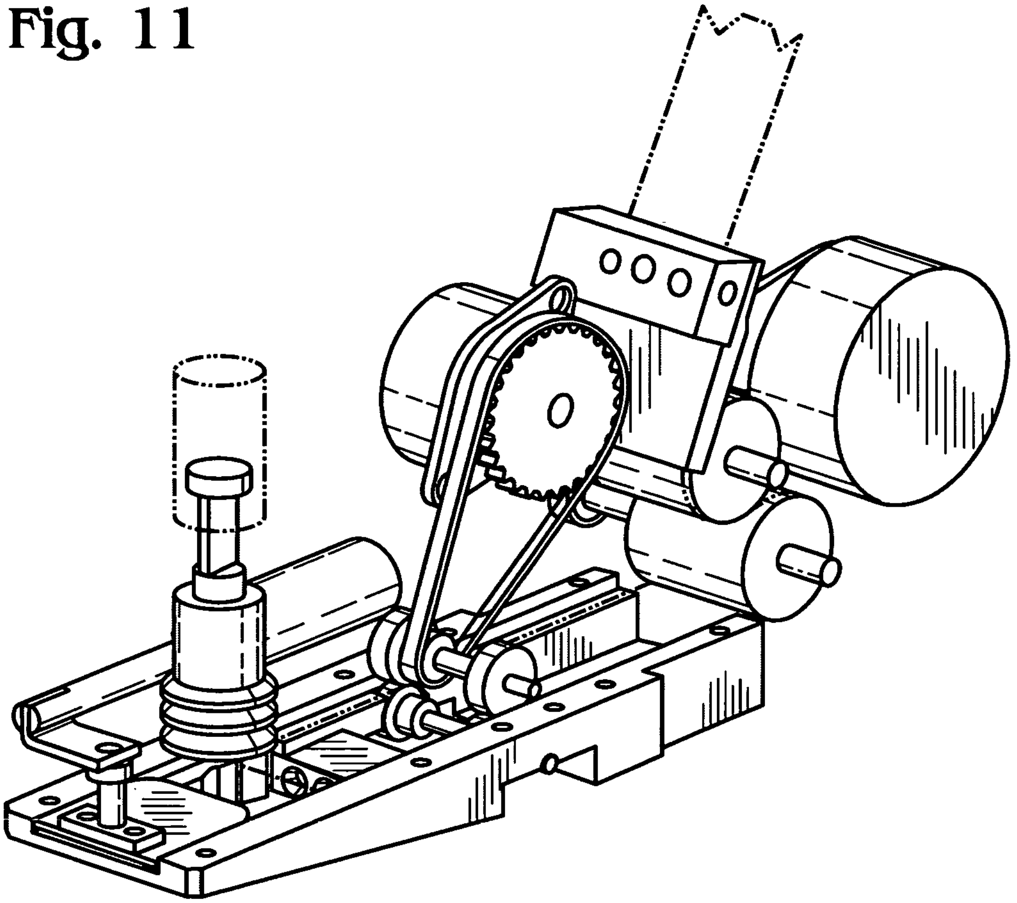
FIG. 11 is an isometric view of the labeling head as shown in FIG. 10.

Turning to the labeling heads 24 that make use of the features of the label webs described above, an example of a labeling head 24 according to the invention is shown in FIGS. 8-14; FIG. 9 is an exploded view of the unit shown in FIG. 8, and FIG. 10 is an exploded view like that of FIG. 9 with some of the component parts removed to provide a clearer focus on the components under discussion. These components may be conceptualized as belonging to one of seven categories: (1) a master label drive mechanism 40; (2) a printer 45; (3) a slave label drive mechanism 50; (4) a label track 60; (5) a knife 70, (6) a label support mechanism 80; and (7) a label applying mechanism 90. FIG. 11 corresponds to FIG. 10 and shows the components not exploded, i.e., in their operating positions. Finally, FIGS. 12-15 show the components in schematic form to make their relationship and operation more clear. For the sake of clarity in FIGS. 13-15, the component categories and the components themselves are referenced only in FIG. 12.

The master label drive mechanism 40 includes a drive motor 42, for driving one or both of two drive rollers 44, particularly 44*a* and 44*b*, between which the label web 28 passes. The aforedescribed release coating allowed the label web to peel from the reel so that it could be received between the rollers 44.

The drive motor 42 may be any type of controllable motor, and is preferably a stepper or servo motor controlled as described further below.

As can be seen in FIGS. 10 and 11, the drive rollers 44 will generally extend across the full width of the label web 28, gripping and therefore make contact with the label web 28 across the entire top and bottom surfaces thereof, to effectively drive the label web 28. In doing so, the drive rollers 44 will come into contact with the aforedescribed adhesive, and will need to be periodically cleaned to remove adhesive that has accumulated on them. However, as partial mitigation of this problem, the drive mechanism 40, and in particular the drive rollers 44, are disposed well upstream of the label applying mechanism 90, which allows for easier access to the drive rollers for cleaning.

As noted previously, the top side of the label web 28 is to bear printing, so that the label is able to serve its purpose of identifying the article being labeled. At least some of this printing is variable printing. A printer 45 applies the variable printing. More particularly, as the printer is built-into the label head 24, the printing operation is performed substantially contemporaneously with the application of the label on the article to be labeled. Printing and label applying can be considered to occur "substantially contemporaneously" when the label is applied to the article within about an hour from the time the printer 45 prints on it, but the time lag will typically be only a few seconds.

The printer 45 is typically a thermal printer, operating in combination with a thermally responsive coating on the label web; however, the printer may employ a different printing technology, such as ink-jet, as desired.

The significantly upstream disposition of the drive rollers 44 presented a problem that the inventors have solved by provision of the secondary label drive mechanism 50. That is, the drive rollers must "push" the label web 28 forward, and the label web is generally not capable of sustaining a pushing (or compressive) force over a long distance without buckling. The slave drive mechanism is to assist the master drive mechanism to feed the label web 28 forward to the label applying mechanism 90.

Particularly, the slave drive mechanism 50 includes a second motor 52 driving a pair of pinch rollers 54, particularly 54*a* and 54*b*. The motor 52 is provided to produce constant tension on the web 28, regardless of whether or how fast the web is moving. For this purpose, the motor 52 is adapted to produce a constant torque, which can be maintained when the motor is stalled. Stepper and servo motors can both be controlled to produce this result, which is referred to as "torque mode." An example of such a motor is that marketed under the trademark "SmartMotor" by Animatics Corporation of Santa Clara Calif., which can be ordered specifically for this purpose. The motor 52 is an example of a "torque motor," which for purposes herein may be any motor operating in torque mode, or any motor or other driving mechanism that can exert a controlled, preferably constant torque independent of speed, including when the speed is zero. By use of a torque motor, the mechanism 50 "follows" and reinforces any forward movement of the label web that the master drive mechanism 40 is able to produce at the rollers 54.

As can be seen in FIG. 11, unlike the drive rollers 44 the pinch rollers 54 are relieved across center portions thereof so that contact is made with the label web 28 only over the aforedescribed grip areas, which are longitudinally disposed at the edges of the label web. Thus, the pinch rollers 54, which are closer to the label applying mechanism 90 and are more difficult to access for cleaning, do not come into contact with any adhesive and therefore reduce or eliminate the need for routine maintenance.

While it is preferred to provide the grip areas as described previously, and to grip the label web at the outermost edges, this is not essential; for example, a grip area may be provided to run down the middle of the label web 28, with the pinch rollers 54 being adapted accordingly.

The master and slave drive mechanisms 40 and 50 together provide the outstanding advantage of ensuring that, when routine maintenance is required for removing adhesive that has been transferred to the labeling head, it can be accomplished where it is easiest to perform.

The label track 60, like the pinch rollers 54, is adapted to make contact with the label web 28 only within the aforedescribed grip areas, thereby likewise avoiding the typical prior art build-up of transferred adhesive and the consequent need for frequent cleaning. Particularly, as can best be seen in FIG. 10, the label web 28 is guided and retained by virtue of having the outermost portion of its edges (e.g., the outermost portions "G" of the edges 102, 103 in FIG. 7) received in longitudinally extending guides 62, particularly 62*a* and 62*b*, of the track 60.

With particular reference to FIGS. 10 and 11, the knife 70 is mounted in relation to the track 60, and is preferably mounted to the track as shown, so that the label web passes over the knife 70, but does not make contact with the label web until the label applying mechanism 90 is in operation, as will be described below. As can be seen, the knife 70 has a cutting edge 72 that is preferably angled, i.e., is disposed at an angle greater than zero but less than 90 degrees, relative to the floor "F" of track 60 and, particularly, the label web 28 as it travels through the track.

Figure 12:
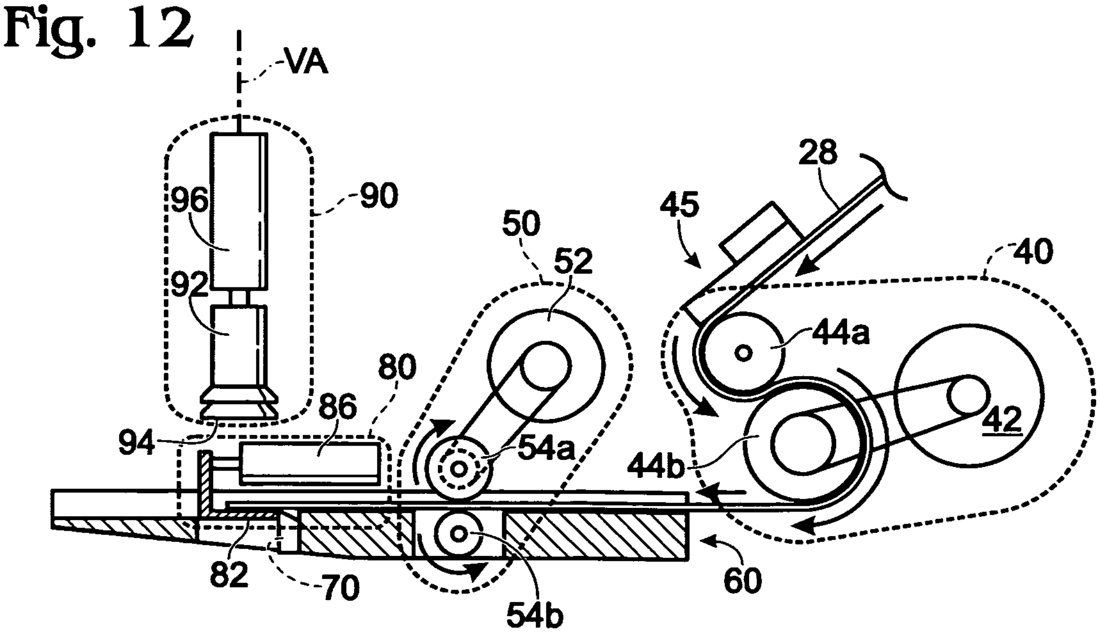
FIG. 12 is a schematic view of the labeling head as shown in FIGS. 10 and 11, showing a label support mechanism according to the present invention in an extended configuration and showing a label applying mechanism according to the invention in a ready configuration.
Figure 13:
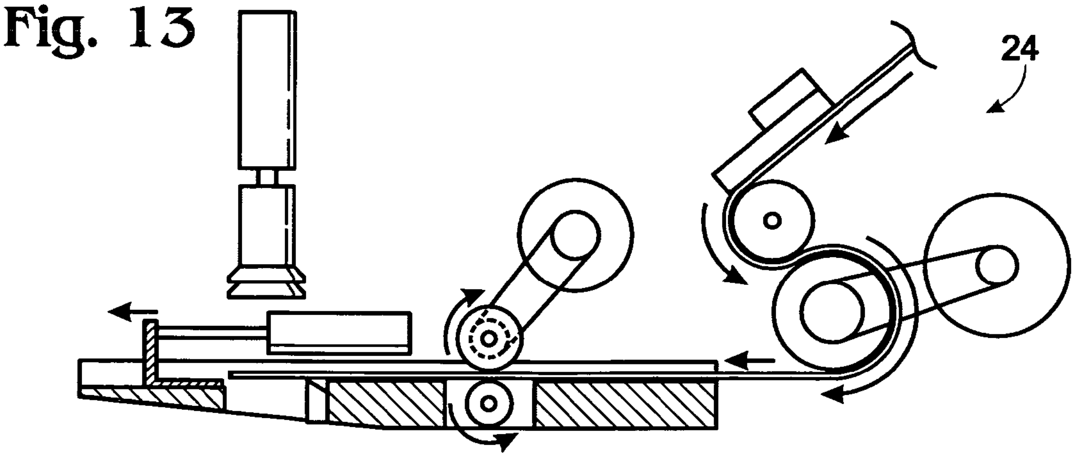
FIG. 13 is a schematic view of the labeling head of FIGS. 10 and 11 corresponding to FIG. 12, showing the label support mechanism in a retracted configuration.
Figure 14:
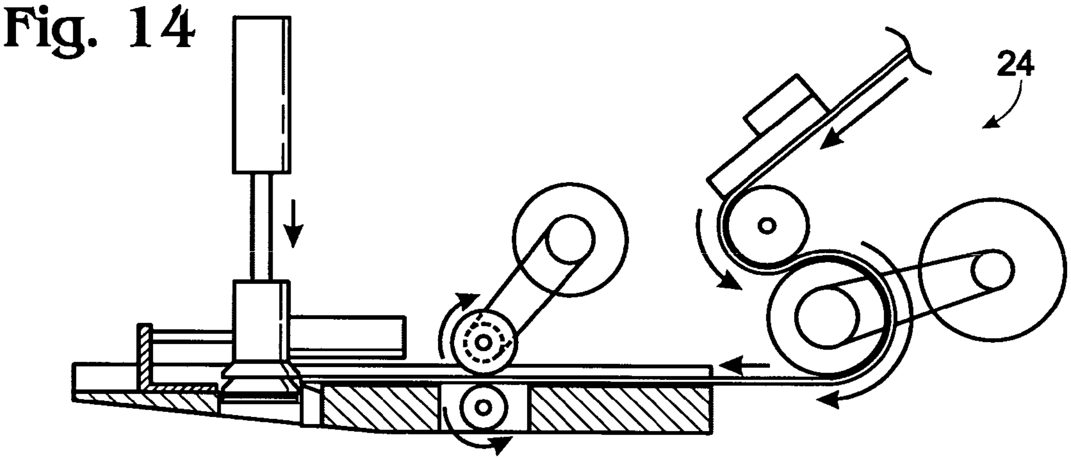
FIG. 14 is a schematic view of the labeling head of FIGS. 10 and 11 corresponding to FIGS. 12 and 13, showing the label applying mechanism moving from the ready configuration of FIG. 12 to a label application configuration.
Figure 15:
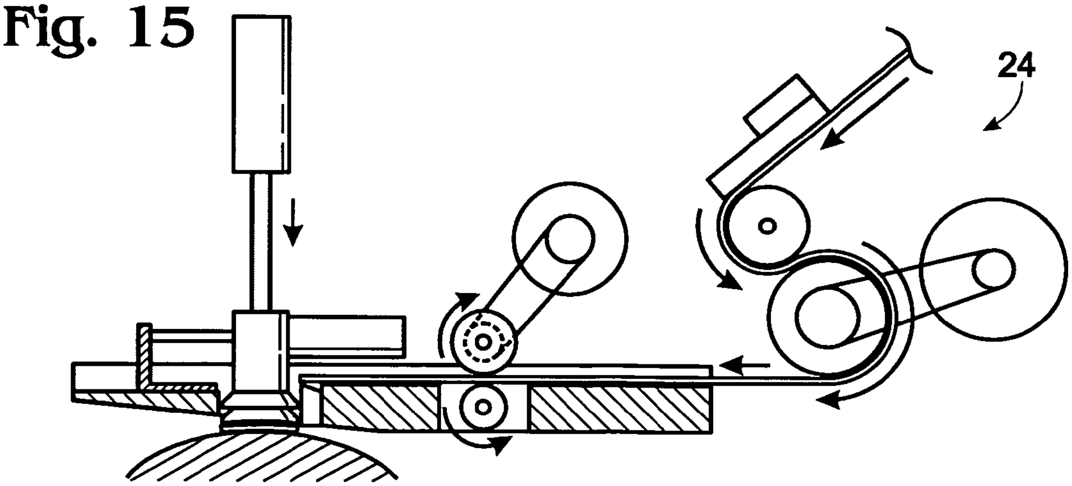
FIG. 15 is a schematic view of the labeling head of FIGS. 10 and 11 corresponding to FIGS. 12-14, showing the label applying mechanism in the label application configuration.

FIG. 12, on the one hand, and 13-15, on the other, show the label support mechanism 80 in two extreme configurations, extended (FIG. 12), and retracted (FIGS. 13-15). Referring back to FIG. 11, the track 60 includes an aperture 64 that is sized and shaped to permit a label portion of a desired size and shape to drop (assuming the orientation shown) through the track without interference. The support mechanism 80 includes a plate 82 that in an extended position thereof, which defines the extended configuration of the support mechanism 80, blocks the aperture 64 so that the label web 28 is supported by the plate 82 over the aperture until the label applying mechanism 90 is ready to apply a label. At such time, a controller (described further below) commands a solenoid 86 or other suitable motive device that is coupled to the plate to retract the plate 82 so that it no longer blocks or covers the aperture 64, which defines the retracted configuration of the support mechanism 80.

FIGS. 12 and 13 show the label applying mechanism 90 in a ready configuration; FIG. 15 shows an extreme opposite, label application configuration of the label applying mechanism, with FIG. 14 showing movement of the label applying mechanism between these two extreme configurations. The ready configuration of the label applying mechanism 90 corresponds to the extended configuration of the support mechanism 80, and the label application position of the label applying mechanism 90 corresponds to the retracted configuration of the support mechanism 80.

The label applying mechanism 90 includes a vacuum chuck 92 for picking up a label portion and placing it on the article. Vacuum chucks are known in the art and it is therefore sufficient to note that the vacuum chuck 92 has a plurality of holes on a preferably flat and circular contact face 94 thereof (not visible), the holes being connected to a vacuum source (not shown). The vacuum chuck in the ready configuration of the label applying mechanism 90 is disposed above (assuming the orientation shown) the plate 82 of the support mechanism, with sufficient spacing being provided therebetween that the label web 28 is not exposed to any significant suction force.

The vacuum chuck 92 is adapted to move, from its position in the ready configuration as shown in FIG. 13, along an axis "VA," down (assuming the orientation shown) to the label application position shown in FIG. 15, by use of a solenoid 96 or other suitable motive device. The aforementioned controller commands the solenoid 96 to move the vacuum chuck 92 from a ready position, defining the ready configuration of the label applying mechanism 90, to a label application position, defining the label application configuration of the label applying mechanism. The speed of the vacuum chuck is preferably not computer controlled for simplicity, but the solenoid 96 could be replaced with an electrically controllable motive device allowing the controller to vary the speed of the vacuum chuck along its travel path if desired.

As the vacuum chuck moves toward the label web 28 from its ready position, it becomes less necessary for the plate 82 to support the label web 28, and so during this transition, the plate 82 is actuated to retract as described above. The vacuum chuck vacuum-adheres to the label web 28 as shown in FIG. 14, and as the vacuum chuck continues to travel to the position shown in FIG. 15, pulls the label web 28 down (assuming the orientation shown) through the aperture 64 of the label track 60.

Returning to FIGS. 4 and 5, assume that the label web 28 terminates at the line segment "d," i.e., the label portion $P_3$ has already been excised from the label web 28 by being applied as label to an article and the label portion $P_1$ is the next label portion to be applied. The action described immediately above causes the label web 28 to cross-wise progressively, due to the aforedescribed angling of the cutting edge 72, contact the knife 70 along the line segment "b." As the label portion $P_1$ is drawn further through the aperture 64, it is eventually torn completely away from the rest of the label web 28 to define the edge "b." To facilitate this tearing action, perforations can be provided in the web along the line segment "b."

While it is preferred to utilize a knife for tearing the label web 28, other structures or mechanisms could be used; for example, a comb-like structure having pointed teeth could be used in place of the knife 70.

The tearing action produced by the label applying mechanism 90 in combination with the knife 70 is distinct from the prior art in that contact with the label is being made only one side thereof. Typically, cutting mechanisms are used in the prior art that require both sides of the label to be supported during the cutting action.

The vacuum chuck 92 continues to travel along the axis VA towards its label application position as shown in FIG. 15 after the label portion $P_1$ has been torn from the web along what is now the edge "b" (FIGS. 4 and 5). The bottom side **28*b* (see FIG. 5) of the label portion $P_1$ carries the adhesive and faces the article. The vacuum chuck completes its travel along the axis VA by bringing the bottom side 28*b* into contact with the article, adhering the label portion $P_1$ thereto, and then returns to the ready position. The plate 82 can be fully returned to its extended position to support the next label portion $P_2$ after the vacuum chuck has cleared the aperture 64. These actions are preferably timed so that the plate 82** begins to retract before the vacuum chuck has cleared the aperture.

The adhesive may adhere to the article strongly enough that the vacuum need not be switched off after the label portion P is applied to the article, to allow the vacuum chuck to withdraw from the label portion P as it returns to its ready position. However, if necessary, the vacuum source or vacuum chuck may be adapted to have a switched supply, and the controller may be adapted to control this switched supply to turn the vacuum off for at least the brief period required to withdraw the vacuum chuck.

During the time that the label portion $P_1$ is in position over the aperture 64 supported by the cover plate 82, until the time that the vacuum chuck 92 has cleared the aperture on its way back to the ready position, the label web 28 cannot be fed forward to place the next label portion $P_2$ into position over the aperture 64. The controller is therefore adapted to control the drive motor 42 of the master drive mechanism 40 so that it does not attempt to feed the label web 28 during this time.

Figure 16:
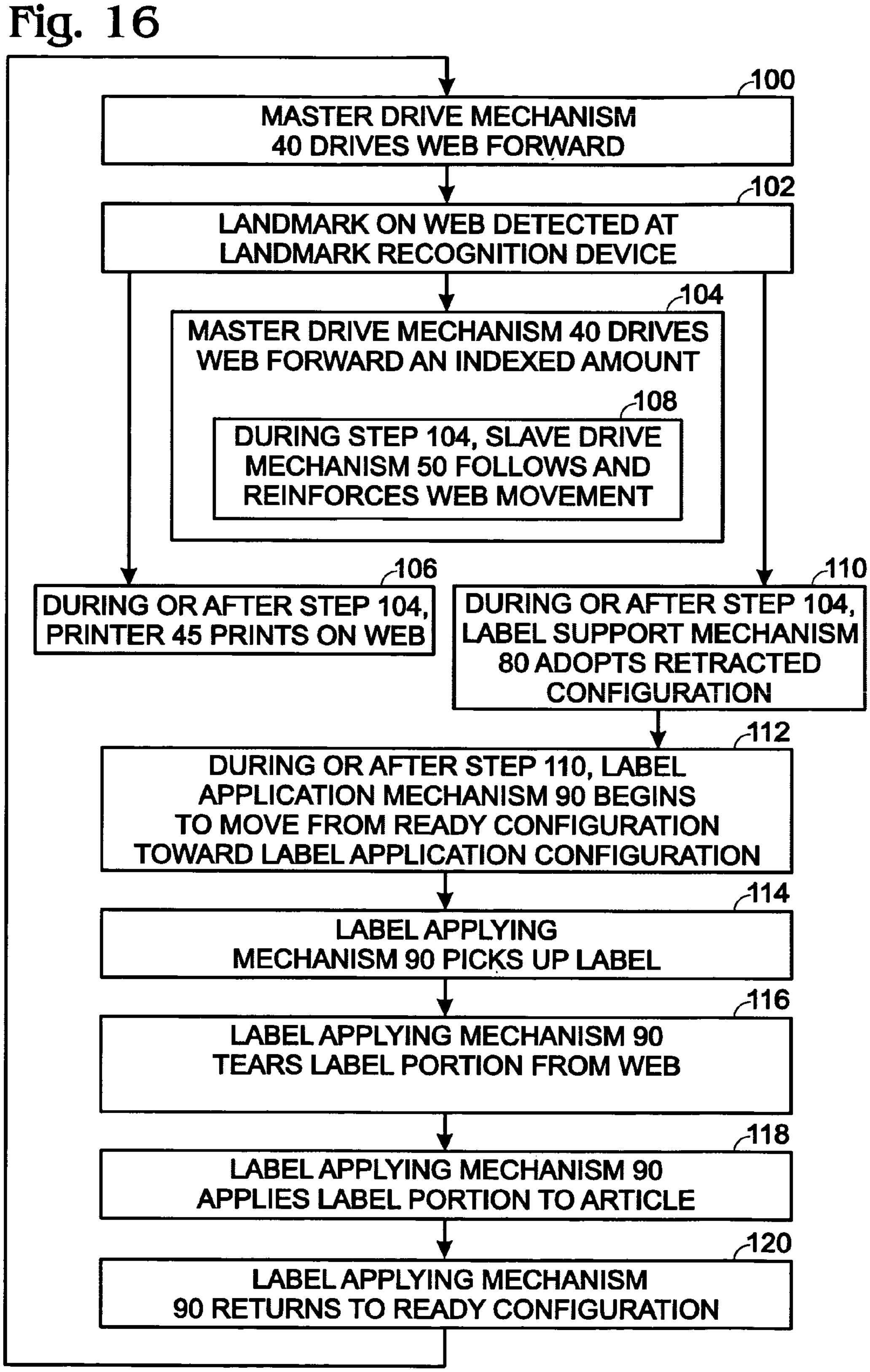
FIG. 16 is a flow-chart showing an operating methodology according to the present invention for operating the labeling head of FIGS. 10-15.

FIG. 16 is a flowchart of the aforedescribed operation, providing some additional detail. A starting condition referred to as step 100 is assumed in which the master drive mechanism 40 is driving the web 28 forward.

In a step 102, an eye-mark, void, or other landmark on the label web corresponding to a label portion such as the portion $P_2$ of FIGS. 4 and 5 is sensed by a photo-detector or other suitable landmark recognition device disposed at a particular, indexed location.

In a step 104, as a result of step 102, the landmark recognition device outputs a signal to the controller which, in turn, commands the master drive motor 42 to drive the label web 28 forward as indicated in FIGS. 12-15 a particular indexed amount; more particularly an amount equal to the length "$L_L$" of the label portion (see FIG. 5).

In a step 106 that occurs during or after step 104, i.e., as the web is being advanced the indexed amount, the controller commands the printer 45 to print variable printing on the web. The controller can track the label portions and know which specific label portion is underneath the printer 45 and therefore can, if desired, adjust the variable printing to suit a particular label portion if desired.

In a step 108 that occurs during step 104, i.e., as the web is being advanced, the slave drive mechanism 50 automatically follows and reinforces this movement, pushing the end label portion $P_1$ onto the plate 82.

In a step 110 that occurs during or after step 104, i.e., either during the time the label portion $P_1$ is being pushed into position over the plate 82, or after the label portion is in position over the plate, the controller commands the label support mechanism 80 to adopt its retracted configuration wherein the solenoid 86 retracts the plate 82 to uncover the aperture 64.

In a step 112 that occurs during or after step 110, the controller commands the label applying mechanism 90 to begin to move from its ready configuration to its label application configuration; particularly, the solenoid 96 begins a downward (assuming the orientation shown in the Figures) stroke of the vacuum chuck 92.

In a step 114, as the chuck 92 descends, it first adheres the label portion $P_1$ to its face by suction.

In a step 116, as the vacuum chuck 92 descends through the aperture, the label portion $P_1$ is torn from the web across the cutting edge of the knife 70.

In a step 118, the vacuum chuck 92 has descended far enough so that the label portion $P_1$ is caused to impact the article, adhering the label thereto.

As will be readily appreciated, the vacuum chuck 92 may be provided with a sensor to sense this impact so that the controller can moderate it, which would require that a more controllable motive device than the solenoid 96 would be needed. However, for sake of simplicity, it is preferable that a limit switch (not shown) is provided to signal to the controller the achievement of maximum stroke, with impact being moderated and controlled by the use of mechanical compliance built-into the vacuum chuck.

In a step 120 occurring during step 118, the limit switch provides a signal to the controller which in turn commands the solenoid 96 to withdraw the vacuum chuck 92 to its ready position.

Finally, after or during the step 120, the controller commands the solenoid 86 to extend the plate 82 back over the aperture 64, an operation that can be completed at such time that the vacuum chuck 92 has been withdrawn far enough to avoid interference between these two components.

Figure 17:
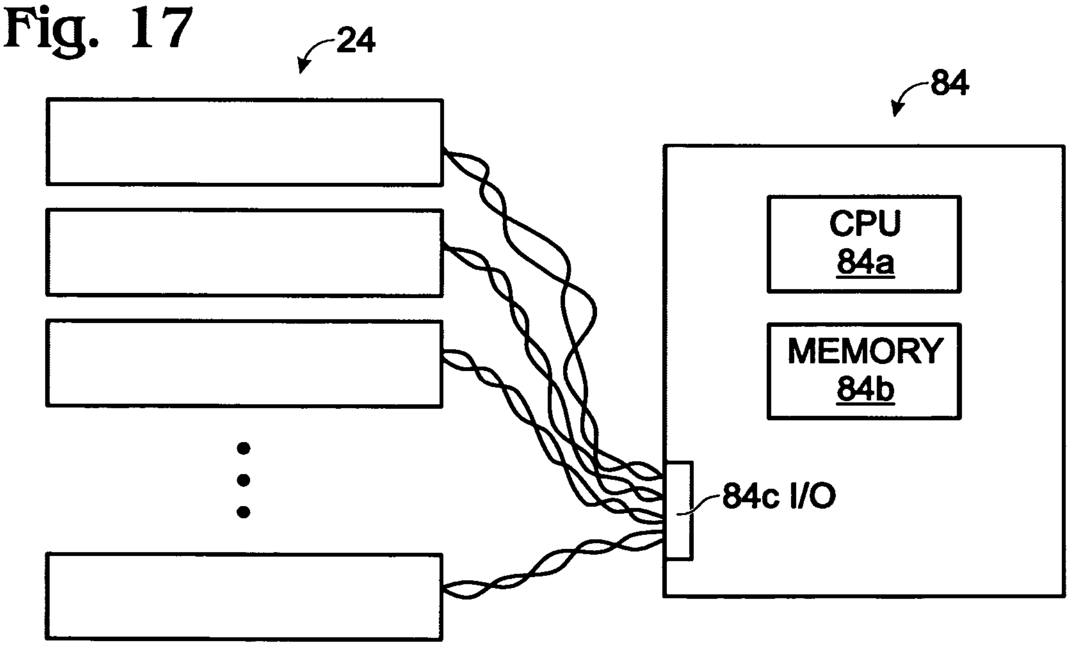
FIG. 17 is a block diagram of a controller for implementing the operating methodology of FIG. 16.

The controller may be implemented in a number of ways, but preferably, it is implemented as a programmed computer or mini-computer. FIG. 17 shows a typical such controller 84 in block diagram form, for controlling a number of the heads 24. As is typical, the controller 84 has a central processing unit 84*a*, a memory 84*b* for storing a suitable program or programs of instruction, and input/output ports 84*c* for receiving the above described signals and issuing the above-described commands.

It is to be understood that, while a specific automated labeling method and label supply therefor has been shown and described as preferred, other methods and configurations could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A method for labeling an article, comprising:

providing an elongate web of liner-less label material defining an elongate axis, and right and left side outer edges, the right and left side outer edges defining respective lines, parallel to the elongate axis, such that said lines define therebetween the maximum width of the web, the web having opposed top and bottom sides, the top side bearing an adhesive resisting composition and the bottom side bearing active adhesive spaced apart from at least one of said lines by at least 1/16" to define first adhesive free areas of the label web associated with either or both of the left and right side outer edges;

driving the web through an automated labeling apparatus including applying a drive force to the web at a selected location on the bottom side of the web at which the application of said drive force is limited to the first adhesive free areas;

printing on the top side of the web within an area corresponding to a selected label portion of the web; and thereafter excising the selected label portion from the web and applying the selected label portion to the article.

2. The method of claim 1, wherein said step of applying is performed substantially contemporaneously with said step of printing.

3. The method of claim 2, further comprising providing the active adhesive within discrete areas of the web that are longitudinally spaced apart from each other by at least 3/32" to define second adhesive free areas between adjacent label portions, wherein excising the selected label portion from the web includes separating the selected label portion from the web within one of the second adhesive free regions.

4. The method of claim 1, further comprising providing the active adhesive within discrete areas of the web that are longitudinally spaced apart from each other by at least 3/32" to define second adhesive free areas between adjacent label portions, wherein excising the selected label portion from the web includes separating the selected label portion from the web within one of the second adhesive free regions.

* * * * *